(12) United States Patent　　　(10) Patent No.: US 12,568,109 B2
Liu et al.　　　　　　　　　　　　(45) Date of Patent: Mar. 3, 2026

(54) METHOD AND DEVICE FOR MINING SECURITY VULNERABILITY OF AIR INTERFACE PROTOCOL, AND MOBILE TERMINAL

(71) Applicant: ZTE CORPORATION, Shenzhen (CN)

(72) Inventors: Tan Liu, Shenzhen (CN); Jinxin Zhang, Shenzhen (CN); Fei Zhang, Shenzhen (CN); Yinyuan Zhao, Shenzhen (CN); Qiyuan Tong, Shenzhen (CN); Yingjun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 72 days.

(21) Appl. No.: 18/690,257

(22) PCT Filed: Feb. 3, 2023

(86) PCT No.: PCT/CN2023/074441
§ 371 (c)(1),
(2) Date: Mar. 7, 2024

(87) PCT Pub. No.: WO2023/155699
PCT Pub. Date: Aug. 24, 2023

(65) Prior Publication Data
US 2024/0380775 A1　　Nov. 14, 2024

(30) Foreign Application Priority Data
Feb. 15, 2022　(CN) .......................... 202210138690.1

(51) Int. Cl.
*H04L 9/40*　　　　(2022.01)

(52) U.S. Cl.
CPC ............ *H04L 63/1433* (2013.01); *H04L 9/40* (2022.05)

(58) Field of Classification Search
CPC ....... H04L 63/1433; H04L 9/40; H04L 69/22; Y02D 30/70; H04W 12/122;
(Continued)

(56) References Cited

U.S. PATENT DOCUMENTS

| | | | |
|---|---|---|---|
| 2008/0282352 A1 | 11/2008 | Beddoe et al. | |
| 2017/0134290 A1* | 5/2017 | Zhang ..................... | H04L 47/25 |

(Continued)

FOREIGN PATENT DOCUMENTS

| | | |
|---|---|---|
| CN | 103209173 A | 7/2013 |
| CN | 107665309 A | 2/2018 |

(Continued)

OTHER PUBLICATIONS

Kim H, Lee J, Lee E, Kim Y. Touching the untouchables: Dynamic security analysis of the LTE control plane. In2019 IEEE Symposium on Security and Privacy (SP) May 19, 2019 (pp. 1153-1168). IEEE. (Year: 2019).*

International Search Report and Written Opinion in Corresponding International Application No. PCT/CN2023/074441, mailed May 16, 2023; 10 pgs.

(Continued)

*Primary Examiner* — James R Turchen
(74) *Attorney, Agent, or Firm* — HAUPTMAN HAM, LLP

(57) ABSTRACT
Embodiments of the present application relate to the technical field of communication transmission security, and in particular, to a method and a device for mining a security vulnerability of an air interface protocol, and a mobile terminal. The method for mining the security vulnerability of the air interface protocol includes: obtaining mutation data, the mutation data being generated according to a fuzzing task; obtaining a service message of the air interface protocol; modifying the service message according to the (Continued)

mutation data; sending the modified service message to a base station; and monitoring a state of the base station, and recording a security vulnerability log according to the state of the base station.

10 Claims, 7 Drawing Sheets

(58) Field of Classification Search
CPC . H04W 12/126; H04W 12/128; H04W 12/60; H04W 80/00
See application file for complete search history.

(56) References Cited

U.S. PATENT DOCUMENTS

| | | | | |
|---|---|---|---|---|
| 2020/0213854 A1* | 7/2020 | Kim | .................... | G06F 11/3006 |
| 2023/0114705 A1* | 4/2023 | Kim | ...................... | G06F 21/577 |
| | | | | 726/25 |

FOREIGN PATENT DOCUMENTS

| | | |
|---|---|---|
| CN | 111628900 A | 9/2020 |
| CN | 113542299 A | 10/2021 |
| CN | 113778879 A | 12/2021 |

OTHER PUBLICATIONS

Nokia et al., "Adding abbreviations and corrections for alignment", 3GPP TSG-SA3 Meeting# 97 S3-194301, dated Nov. 11, 2019; 14 pgs.
Kim et al., "Touching the Untouchables: Dynamic Security Analysis of the LTE Control Plane", Symposium on Security and Privacy IEEE, 2019; 17 pgs.
Potnuru et al., "ASN. 1-based Fuzzing of Radio Resource Control Protocol for 4G and 5G", International Conference on Wireless and Mobile Computing, Networking and Communications IEEE, dated Oct. 11, 2021; 7 pgs.
Search Report in Corresponding European Application No. 23755702. 0, dated Dec. 3, 2024; 10 pgs.
Yu et al., "Improving 4G/5G air interface security: a survey of existing attacks on different LTE layers", Computer Networks, dated Nov. 6, 2021; 29 pgs.

* cited by examiner

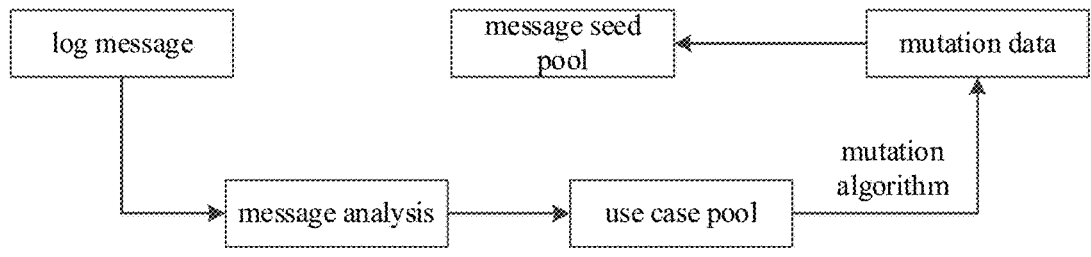
FIG. 4
| MAC | | | | RLC | | | PDCP | | | | PAY LOAD |
|---|---|---|---|---|---|---|---|---|---|---|---|
| R | F | lcid | L | SI | SN | SO | DC | R | SN | MACI | |
| MAC | | | | RLC | | | PDCP | | | | PAY LOAD |
| R | F | lcid | L | SI | SN | SO | DC | R | SN | MACI | |
| **** | | | | | | | | | | | |
FIG. 5
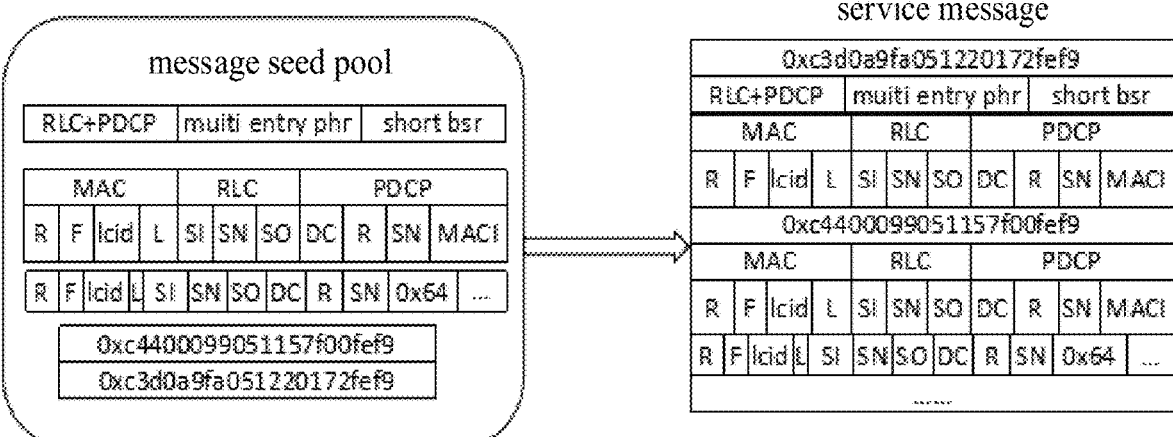
FIG. 6

METHOD AND DEVICE FOR MINING SECURITY VULNERABILITY OF AIR INTERFACE PROTOCOL, AND MOBILE TERMINAL

CROSS-REFERENCE TO RELATED APPLICATIONS

The present application is the National Stage of International Application No. PCT/CN2023/074441, filed on Feb. 3, 2023, which claims priority to Chinese Patent Application 202210138690.1, filed on Feb. 15, 2022.

TECHNICAL FIELD

Embodiments of the present application relate to the technical field of communication transmission security, and in particular to a method and a device for mining a security vulnerability of an air interface protocol, and a mobile terminal.

BACKGROUND

With the large-scale commercial use of 5G networks, 5G base stations are an indispensable part of wireless communication networks, and their security has received widespread attention. 3GPP security assurance specification (SCAS), communications regulatory authorities and operators all have security testing requirements of the air interface protocol, so the mining of the security vulnerability of the air interface protocol based on fuzz testing becomes particularly important.

In this regard, the fuzz testing of long term evolution (LTE) network control components and control plane process adopt the fuzz testing of conventional process replay, that is, the original business data of the completed business is sent again. Since there is usually an encrypted authentication process that cannot be reused in the business process, if the business is still successfully completed after the original business data is sent again, it proves that there is a security problem in the business execution process; this method is only applicable to fixed test scenarios, such as the application layer for easy-to-standard test scenarios. It is not applicable to the underlying network where the test scenario cannot be clearly defined, the air interface protocol cannot be fuzz tested, and the security of information transmitted between the user equipment (UE) and the air interface of the 5G base station cannot be guaranteed.

SUMMARY

The main purpose of the embodiments of the present application is to provide a method and a device for mining a security vulnerability of an air interface protocol, and a mobile terminal.

In order to achieve the above purpose, an embodiment of the present application provides a method for mining a security vulnerability of an air interface protocol, which is applied to a mobile terminal. The method includes: obtaining mutation data, the mutation data is generated according to a fuzzing task; obtaining a service message of the air interface protocol; modifying the service message according to the mutation data; sending the modified service message to a base station; monitoring a state of the base station; and recording a security vulnerability log according to the state of the base station.

In order to achieve the above purpose, an embodiment of the present application also provides a device for mining a security vulnerability of an air interface protocol. The device includes: a first obtaining unit configured to obtain mutation data, the mutation data is generated according to a fuzzing task; a second obtaining unit configured to obtain a service message; a modifying unit configured to modify the service message according to the mutation data; a sending unit configured to send the modified service message to a base station; and a recording unit configured to monitor a state of the base station, and record a security vulnerability log according to the state of the base station.

To achieve the above purpose, an embodiment of the present application further provides a mobile terminal, including: at least one processor; and a memory communicatively connected to the at least one processor; instructions executed by the at least one processor are stored in the memory; the instructions are executed by the at least one processor, so that the at least one processor performs the method for mining the security vulnerability of the air interface protocol.

To achieve the above purpose, an embodiment of the present application further provides a computer-readable storage medium storing a computer program, when the computer program is executed by a processor, the method for mining the security vulnerability of the air interface protocol is implemented.

In traditional solutions, most of the air interface protocol tests are to complete the function and performance tests, and it is difficult to find some deeper and wider security problems. For example, most air interface protocol tests are to test the normal use functions or performance parameters of the base station, focusing on the application layer. Processes such as scenarios with deep call chains, implementation of protocols, and execution of protocol standards cannot be detected. Among them, the scenes with deep call chains, such as: code-level functions are implemented by multi-layer interfaces, and there are many call relationships, etc. In the embodiment of the present application, a mobile terminal based on an open bottom layer interface is provided to realize a method for mining a security vulnerability of an air interface protocol of the fuzz testing. Since the mobile terminal can open the bottom layer port, it is allowed to modify the service message of the air interface protocol, that is, by obtaining the mutation data and the service message of the air interface protocol, modifying the service message based on the mutation data, sending the modified service message to the base station, and monitoring the state of the base station in real time, it is possible to record the security vulnerability log of the air interface protocol and mine the effect of security vulnerability in the air interface protocol, which can improve the robustness and security of the base station and increase product competitiveness.

BRIEF DESCRIPTION OF THE DRAWINGS

FIG. 4 is a third schematic diagram of mutation data generation according to an embodiment of the present application.

FIG. 5 is a first schematic diagram of a data structure according to an embodiment of the present application.

FIG. 6 is a second schematic diagram of a data structure according to an embodiment of the present application.

DETAILED DESCRIPTION OF THE EMBODIMENTS

In order to make the purpose, technical solutions and advantages of the embodiments of the present application clearer, the embodiments of the present application will be described in detail below with reference to the accompanying drawings. However, those skilled in the art can understand that in each embodiment of the application, many technical details are provided for readers to better understand the present application. However, even without these technical details and various changes and modifications based on the following embodiments, the technical solutions claimed in the present application can also be realized. The division of the following embodiments is for the convenience of description, and should not constitute any limitation to the specific implementation of the present application, and the embodiments can be combined and referred to each other on the premise of no contradiction.

Figure 1:
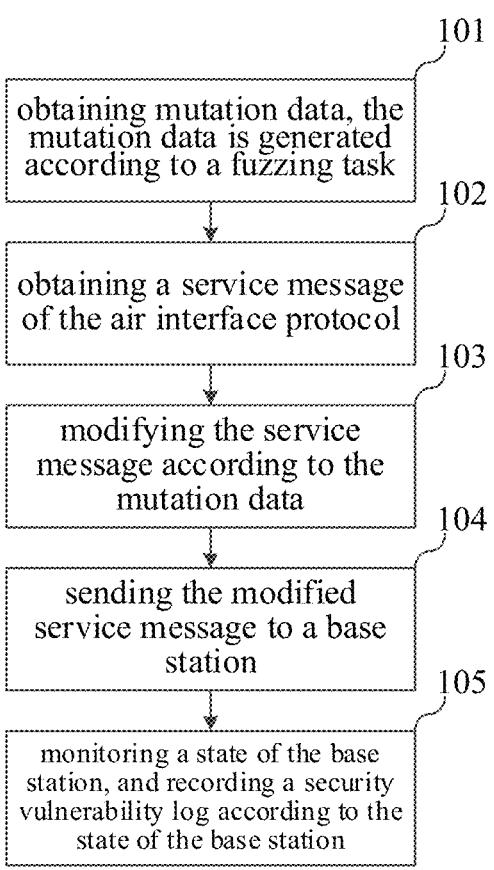
FIG. 1 is a flowchart of a method for mining a security vulnerability of an air interface protocol according to an embodiment of the present application.

An embodiment of the present application relates to a method for mining a security vulnerability of an air interface protocol, which is applied to mobile terminal, and the mobile terminal supports the opening of the bottom layer interface. That is, after the mobile terminal completes the packaging of the service message and before sending it to the physical layer for processing, the mobile terminal analyzes the service message and modifies the service message. The process of analyzing the service message and modifying the service message is generally implemented through a customized low-level interface. Opening the bottom layer interface means that in-depth customization can be carried out on the mobile terminal to realize the fuzz testing function. The specific flow of the method for mining the security vulnerability of the air interface protocol in this embodiment can be shown in FIG. 1, including:

Step 101, obtaining mutation data, which is generated according to the fuzzing task;

Step 102, obtaining the service message of the air interface protocol;

Step 103, modifying the service message according to the mutation data;

Step 104, sending the modified service message to the base station;

Step 105, monitoring the state of the base station, and recording the security vulnerability log according to the state of the base station.

The implementation details of the method for mining the security vulnerability of the air interface protocol in this embodiment are described in detail below. The following content is only implementation details provided for easy understanding, and is not necessary for implementing this solution.

In step 101, obtaining mutation data; the mutation data is generated according to the fuzzing task. That is, the mobile terminal obtains the mutation data required in the fuzz testing process, and the mutation data is used to provide an unexpected input for the operation of the base station, and then the mobile terminal can monitor the operating state of the base station based on the unexpected input data to discover the security vulnerability of the base station. In some cases, the fuzzing task and mutation data can be preset in a storage device, which is connected in communication with the mobile terminal or placed in the mobile terminal. The mobile terminal matches the corresponding fuzzing task in the storage device according to the detected real-time base station business, and queries and obtains the corresponding mutation data according to the fuzzing task.

In one example, the mobile terminal receives the mutation data obtained by the server according to the fuzzing task. It can be understood that the data in the data preset in the storage space is limited, so when querying the mutation data from the preset data, the results of the mutation data obtained are also limited; if the mutation data is limited, to a certain extent, it will limit the effect of fuzz testing. This embodiment provides a server for providing mutation data for the mobile terminal, that is, the server can generate a fuzzing task according to the current service of the base station, and obtain mutation data according to the fuzzing task. That is to say, the mutation data received by the server according to the fuzzing task received by the mobile terminal is personalized and generated by the server according to the actual situation, and it is not a limited amount of data pre-stored in the storage space, and it is not limited to the fuzzing task or the mutation data. The method for generating mutation data provided by the mobile terminal receiving server in this embodiment expands the type, quantity and coverage of mutation data, and can ensure the effect of fuzz testing.

When the server generates the fuzzing task, the fuzzing task can be obtained through the protocol data model in the server. The protocol data model is generated by analyzing the protocol features and service features of the 5G air interface protocol. Protocols such as service data adaptation protocol (SDAP), radio resource control (RRC) protocol, packet data convergence protocol (PDCP), radio link control (RLC) protocol, media access control (MAC) protocol, etc. Protocol features such as SDAP protocol and RRC protocol, etc. SDAP protocol is unique to the user plane, while RRC protocol is unique to the control plane, and other protocols are shared by the user plane and the control plane; business features include the role played by each protocol layer in the business, and services such as cell search, system information, paging, measurement, random access, etc. The protocol data model combines the protocol features and service features to generate the matching relationship between different services and protocols, including the cell search model CELL_SEARCH_DATA_MODEL, the random access model RANDOM_ACCESS_DATA_MODEL, etc. The protocol data model can first identify the services of the base station in real time, and based on these matching relationships, the service messages of the protocols that need to be mutated are determined. The fuzzing task is generated in combination with user requirements or preset requirements. It is understandable that the protocol data model can be set for closed-loop learning and regular error checking and updating, etc., and can also handle more complex details. Compared with directly matching fuzzing task through preset correspondences, the fault tolerance rate is higher and the recognition accuracy is higher, which can further guarantee the effect of obtaining the fuzzing task.

In addition, a task management module can be set in the above server to control the start and sequence of processes such as configuration, initiation, stop, suspension and recovery of the fuzzing task.

In an example, the receiving the mutation data generated by the server according to the mutation method; the mutation method is determined by the fuzzing task, and the mutation method includes one of the following or any combination thereof: simultaneous mutation of multiple protocol fields, disordered mutation, feedback mutation. According to the content of the fuzzing task, the mutation method corresponding to the content can be selected.

Figures 2, 3:
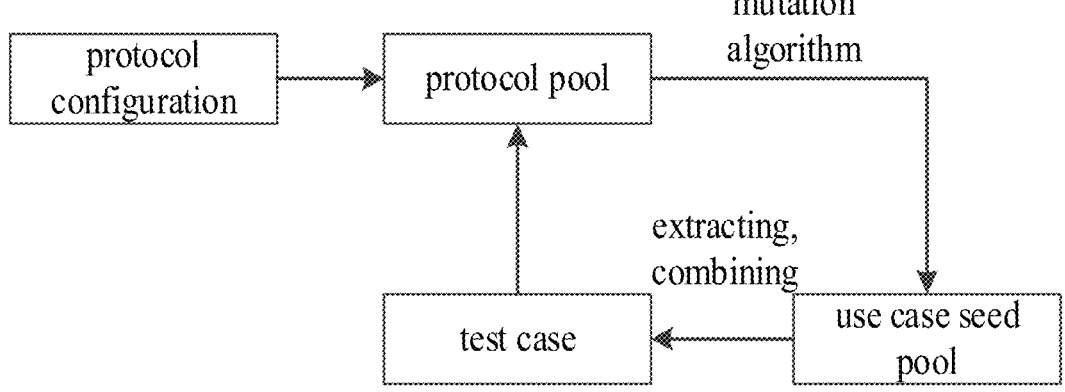
FIG. 2 is a first schematic diagram of mutation data generation according to an embodiment of the present application.
FIG. 3 is a second schematic diagram of mutation data generation according to an embodiment of the present application.

Simultaneous mutation of multiple protocol fields can improve the coverage of fuzz testing. For details, referring to FIG. 2, in which, the implementation process of simultaneous mutation of multiple protocol fields, for example: first obtaining the protocol configuration (including the service message of the protocol and the characteristics of the protocol, etc.), and arranging and combining them and putting them into the protocol pool. The permutation and combination process can refer to the formula:

$$C_m^n = \frac{m!}{(m-n)!n!}.$$

The protocol configuration contains the name, length, and value of each field of multiple protocols. The protocol pool is composed of protocols plus field names, lengths, and values, such as the DC field name of the RLC protocol, the F field value of the MAC protocol, and the length and value of the LCID field of the MAC protocol, etc. In the formula, m and n can represent the specific layers of protocols, and can also represent the fields of a certain protocol; for example, two of the four protocols can be selected for fuzz testing, and 3 fields out of 5 protocol fields of a certain protocol can also be selected. A mutation algorithm is used for the data in the protocol pool. The protocol pool is a collection of service messages of the protocols that may be used. The result collection obtained by passing the data in the protocol pool through the mutation algorithm (the type of specific mutation algorithm is not limited here) is used as the use case seed pool, and the data in the use case seed pool is extracted and combined to obtain test cases. The newly generated test cases are placed into the original protocol pool. The newly generated test cases are the mutation data, that is, the mutation data is added to the original protocol pool. In addition, when placing the newly generated test cases into the original protocol pool, the method of looping through the protocol pool can cover a variety of test scenarios and cover all the generated test cases. Since the multi-field simultaneous mutation method has no restrictions on the fields or types of mutations, that is to say, the coverage of the mutation results is relatively large, which can greatly improve the coverage of test cases in fuzz testing, thereby ensuring the coverage of fuzz testing.

Unordered mutation can realize replay, sequence, reverse order and other fuzz testing processes. It does not use the data calculation process of the algorithm, but mainly selects special values. For details, please referring to FIG. 3, in which, the implementation process of disordered mutation, for example: analyzing the characteristics of the service messages of the protocol that needs to be mutated, and taking corresponding processing measures according to the fuzzing task; the processing measures include the default of all data used as the mutation data of the fuzz testing (that is, all data are traversed during the fuzz testing), or the boundary values are all used as the mutation data; or the formula: $a_n = a_1 + (n-1)d$, or the formula: $a_n = a_1 \times q^{n-1}$, selecting the mutation data that participate in the fuzzing task, that is, the mutation data can choose the arithmetic sequence $a_n = a_1 + (n-1)d$, the geometric sequence $a_n = a_1 * q^{n-1}$; or choosing $a_1$, $a_1$ is the first test case selected, d is the tolerance of the arithmetic sequence, q is the common ratio of the geometric sequence, and $a_n$ is the nth test case selected; at the same time, it can be set to obtain the detection order of the mutation data as Positive/Reverse, that is, test cases are selected in positive or reverse order; in this case, the selection range of the mutation data is: $\min < a_n < \max / a_n = a_{Finxed}$, and min represents the minimum number of cases selected value, that is, selecting at least one test case, $\max / a_n = a_{Finxed}$ is the maximum value of the test case, that is, the maximum number of test cases that can be stored in the test case pool.

The feedback mutation is suitable for monitoring, recording, analysis and other processes in fuzz testing, as shown in FIG. 4. The specific implementation of feedback mutation, for example: identifying the state change of the log message of the base station, and analyzing the state characteristics of the log message according to the formula, that is, the analysis of the state change of the log message, for example, through the formula:

$$p(c_i \mid \omega) = \frac{p(\omega \mid c_i) p(c_i)}{p(\omega)},$$

where $c_i$ represents the type of air interface protocol, and $\omega$ represents the state characteristics of the obtained log messages of the base station. This calculation formula is used as a Bayesian classification model, which is mainly used to obtain the state characteristics for a certain air interface protocol type edge probability to complete the analysis of the state characteristics of the log message; the analyzed result is supplemented and updated to the use case pool, the analyzed result is used to obtain the mutation data, and in this implementation, the use case pool is used to provide the mutation data of the fuzz testing for the message seed pool. The mutation data used for fuzz testing is obtained by processing the data in the use case pool through the mutation algorithm and placed in the message seed pool. The terminal obtains the data in the message seed pool, that is, the mobile terminal obtains the mutation data. In some examples, the mobile terminal may send a request for the log message of the base station to the base station, and the base station may feed back the corresponding log message to the mobile terminal after receiving the request for the log message. When receiving the feedback log message, the mobile terminal analyzes the log message and then obtains the state characteristics of the log message. In addition, the mobile terminal can also send a request for the state characteristics of the log message of the base station to the base station, and the base station will give feedback after receiving the request, and the feedback information will carry the state of the log message of the base station feature; after receiving the feedback, the mobile terminal can obtain the state feature of the log message of the base station. It can be understood that, in the specific implementation process of the present application, the state characteristics of the log message of the base station are not limited.

For step 101, in one embodiment, the server analyzes the characteristics of the 5G air interface protocol (SDAP/RRC/ PDCP/RLC/MAC, etc.), and generates a protocol data model according to its characteristics. The mobile terminal accesses the base station and obtains the current air interface protocol configuration information, and generates mutation data combined with three different machine learning methods. The input message of the machine learning method can be generated according to a specific business model, such as simultaneous mutation of multiple protocol fields; it can also be a real service message extracted from a mobile terminal, such as disordered mutation, so as to automatically and gradually improve the coverage of test cases in an unattended state, and then discover deep-seated problems. It is also possible to introduce real service messages as a feedback loop, such as feedback mutation, to incorporate machine learning methods and signaling state machine models, and automatic behavior learning closed-loop and state machine model update. After the mutation data is generated, it can be sent to the communication module of the mobile terminal through the forwarding module for storage. The task management module of the server or other server can be responsible for the configuration, initiation, stop, suspension and recovery of the fuzzing task; the forwarding module is responsible for completing the control and data interaction between the server and the mobile terminal.

Step 102, obtaining service messages of the air interface protocol. The service message of the air interface protocol is a service message that needs to be transmitted to the base station during the information exchange process between the mobile terminal and the base station. That is to say, before sending the service message to the base station, the mobile terminal needs to obtain the service message to be sent for subsequent processing of the service message to meet the requirements of the fuzz testing.

In an example, after obtaining the service message of the air interface protocol and before modifying the service message according to the mutation data, the method further includes: analyzing the service message. For example, when a mobile terminal accesses a base station (such as a 5G base station) for data services, the analyzing module will analyze the service messages packaged by the L3 and L2 protocols on the air interface of the mobile terminal according to the standard protocol packet format, and identify the protocol layers, protocol fields, and protocol field attributes in which they are located. Among them, the analysis of the service message is mainly completed with reference to the 3GPP protocol format. After the message is analyzed, the protocol layer (such as MAC, RLC, etc.), protocol fields (such as logical channel identify (LCID), segment information (SI), serial number (SN, etc.)) and protocol field attributes (such as length, etc.) can be identified. The formats of several Service Data Unit (SDU) of one terabyte (TB) block of service messages are shown in FIG. 5. For the format shown in FIG. 5, where payload is the payload; R represents the reserved field; DC represents the data/control field; L represents the field of the length of the SDU or control message, and its length is indicated by the F field; F is used to indicate the length of the L; if the length of the SDU or control message is greater than 128 bytes, then F=1 is set, otherwise F=0 is set; SO indicates the segment offset field.

Step 103, modifying the service message according to the mutation data. After the mobile terminal obtains the mutation data and the service message of the air interface protocol, it matches the mutation data with the service message in combination with the fuzzing task, that is, modifying the service message according to the mutation data, and writing the generated fuzz testing data into the data position corresponding to service message. It can be understood that the fuzzing task can be obtained by the mobile terminal alone or together with the mutation data.

Taking feedback mutation as an example, the obtained mutated log message is stored in the message seed pool, and then the service message is modified with the message in the message seed pool, and the message modification is completed. FIG. 6 shows several SDU format modification methods for a TB block of service messages, where Multi entry phr means multi-entry power headroom report, phr is called Power Headroom Report, and short bsr means short BSR format.

In one example, after the mobile terminal receives the mutation data, it will store it in the inter-core shared memory. After the service message analysis of the air interface protocol is completed (for example, the service message analysis of the 5G air interface protocol), the mobile terminal obtains the required mutation data according to the fuzzing task. The components of the mutation data also include the message header, where the message header can be customized according to requirements.

In an example, modifying the service message according to the mutation data includes: determining a data position corresponding to the mutation data in the analyzed air interface protocol service message; modifying the analyzed air interface protocol service message according to the mutation data at the data location. Among them, the fuzzing task can support the modification of the fields in the service message of a single or multiple 5G air interface protocols, and can also support the modification of a certain segment of the service message. Since the mutation data may be data generated by different protocols, it needs to be placed in the corresponding position where it is generated, so as to prevent the location change of the mutation data from affecting the structure of the service message, for example, to cause the protocol to detect structural problems during execution. Including the situation that the verification rules are not met, and the relevant service messages are directly discarded, and the fuzz testing cannot be performed. The influencing factors in the execution process of the fuzzing task are further reduced, the smooth execution of the fuzzing task is guaranteed, and the testing efficiency is improved.

In an example, modifying the service message according to the mutation data includes: modifying the service message according to the mutation data within a scheduling delay of the service message. For example, the mobile terminal will complete the modification of the service message according to the fuzzing task, and use the knuth-morris-pratt (KMP) algorithm to make the time consumption of obtaining and modifying the service message not exceed the time range of service scheduling.

Step 104, sending the modified service message to the base station. After the message processing module in the mobile terminal obtains the mutation data, it completes the modification of the 5G air interface protocol message according to the fuzzing task configured on the server. When the obtained and modified 5G air interface protocol message meets the delay requirements of the 5G air interface protocol, the service scheduling, according to the original time window, sends the modified service message to the 5G base station through the physical layer and radio frequency antenna.

Step 105, monitoring the state of the base station, and recording security vulnerability logs according to the state of the base station. That is, after the mobile terminal sends the service message modified according to the mutation data to the base station, it detects the operation state of the base station, so as to discover the security vulnerability of the base station.

In one example, recording the security vulnerability log according to the state of the base station includes: the mobile terminal identifies whether the base station has a security vulnerability according to the state of the base station; if there is a security vulnerability, recording a security vulnerability log; the security vulnerability log includes protocol fields, service messages before and after mutation, and the system log of the mobile terminal.

Figure 7:
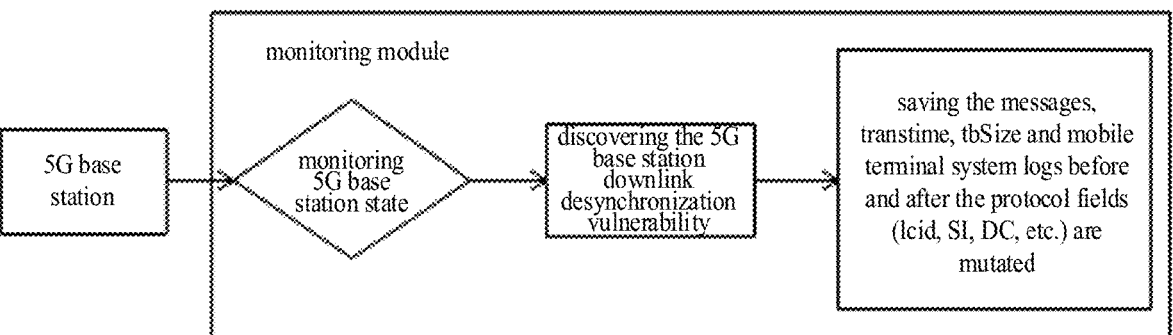
FIG. 7 is a first schematic diagram of the method for mining the security vulnerability of the air interface protocol according to an embodiment of the present application.

The mobile terminal monitors the state of the base station in real time, and judges whether a security vulnerability is found based on the state information of the base station obtained through the interface of the mobile terminal, and then the mobile terminal can confirm whether the 5G base station generates an abnormal alarm or the system crashes through the network management system of the 5G base station. After a security vulnerability is discovered, the security vulnerability log is collected. The security vulnerability log contains the necessary information needed to locate the problem, which is used to help accurately locate the trigger location of the security vulnerability and provide a favorable support for finding a solution to the security vulnerability. Taking the discovery of a downlink out-of-sync vulnerability in a 5G base station as an example, after the discovery of the vulnerability, it is necessary to save information such as packets, transtime, tbSize, and mobile terminal system logs before and after mutation of protocol fields (lcid, SI, DC, etc.). The system log information of the 5G base station system is matched in this time slice, and then the protocol field that triggers the vulnerability is confirmed. Taking the discovery of downlink out-of-sync vulnerabilities in 5G base stations as an example, the working process of the monitoring module in the mobile terminal is shown in FIG. 7.

Among them, the abnormal state of the 5G base station that the mobile terminal can perceive mainly includes abnormal state such as cell abnormality, link uplink out-of-sync, link downlink out-of-sync, and link re-establishment. It is also possible to confirm through the network management system of the 5G base station whether there is an alarm or system abnormality in the 5G base station system. The task of monitoring the state of the base station is mainly completed by the monitoring module in the mobile terminal. The monitoring module obtains the state of the base station from the interface of the mobile terminal. In addition, the monitoring module can also be responsible for the real-time forwarding function of the log when the state of the base station is normal or abnormal, and sends it to the server through the communication module. The server maintenance and measurement module will complete the local storage and interface display of the base station state and recorded logs.

In an example, after recording the security vulnerability log according to the state of the base station, the method further includes: retesting the security vulnerability according to the security vulnerability log to determine the problematic protocol field of the security vulnerability. That is, it supports retesting of detected security vulnerabilities, which is convenient for developers to repair the vulnerabilities.

For example, taking the discovery of a downlink out-of-sync vulnerability in a 5G base station as an example, after the system discovers the vulnerability, it will store the business scenario of the fuzz testing at this time, the mutation data generated by the 5G air interface protocol data model (such as the random access model), and the test case generated by the mutation data. If vulnerability retesting is required, the system will use the information stored when the vulnerability is discovered and conduct fuzz testing again according to the process of discovering the vulnerability to complete the recurrence of the security vulnerability. In some execution processes, related functions can be implemented by triggering the fuzzing retesting function of task management in the system.

Figure 8:
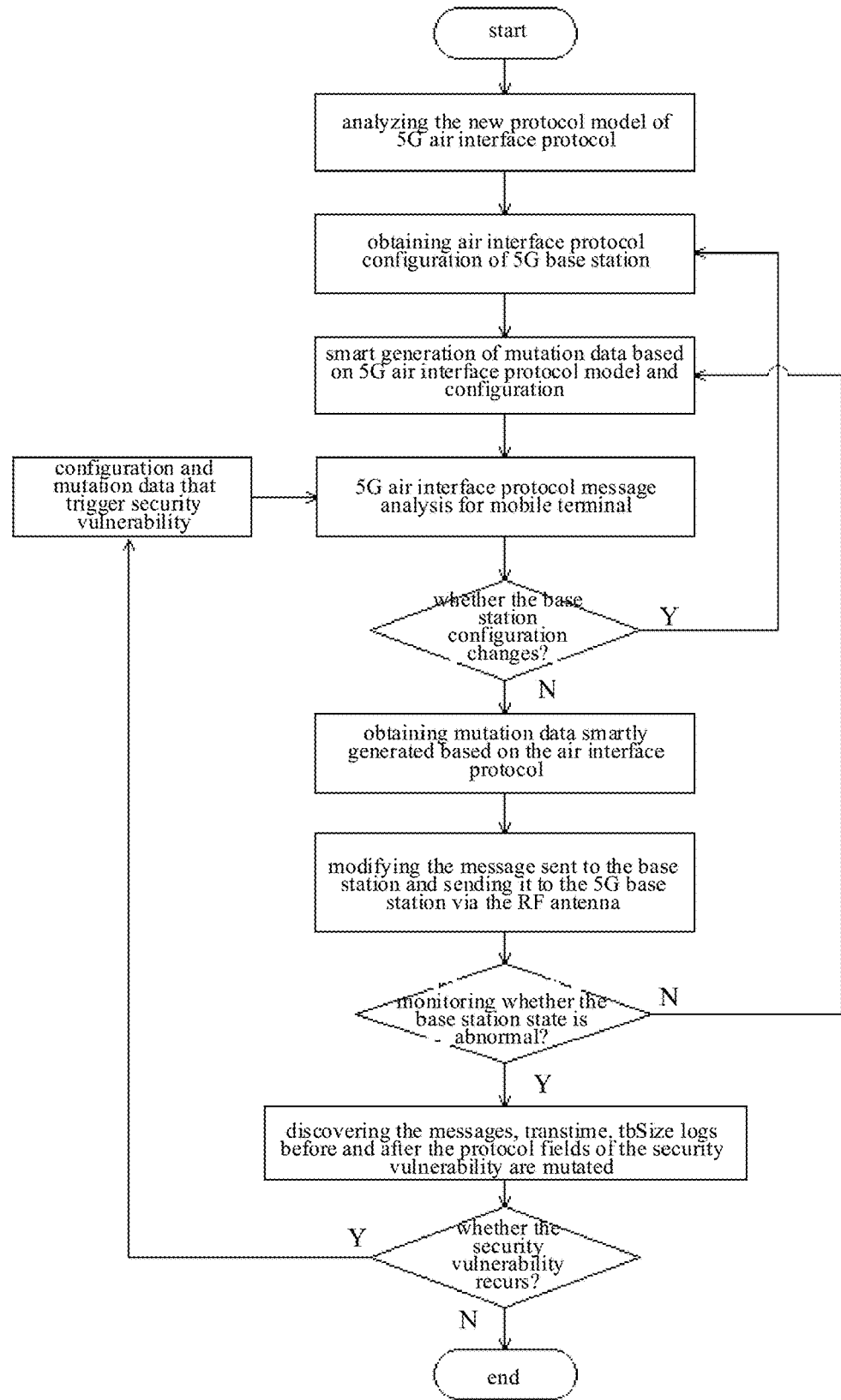
FIG. 8 is a second schematic diagram of the method for mining the security vulnerability of the air interface protocol according to an embodiment of the present application.

In an example, the implementation process with the retesting process is shown in FIG. 8, the protocol model is the above protocol data model; the 5G base station air interface protocol configuration is the above protocol configuration, and the base station configuration is the aforementioned base station air interface protocol configuration.

In addition, the user interface in the mobile terminal mainly includes environment configuration, task management and task details. Specifically, as for environment configuration, configuration items such as background/log server address, business address, foreground/SFTP server address, environment identification number, etc.; task management, responsible for background and foreground fuzz testing terminal test task delivery and task management functions, which supports the multi-task sequential test and single-task test in different modes, and also supports the functions of manually stopping the test, pausing/resuming the test and clearing the records; task details mainly include three parts: state statistics, task details and message statistics.

Figure 9:
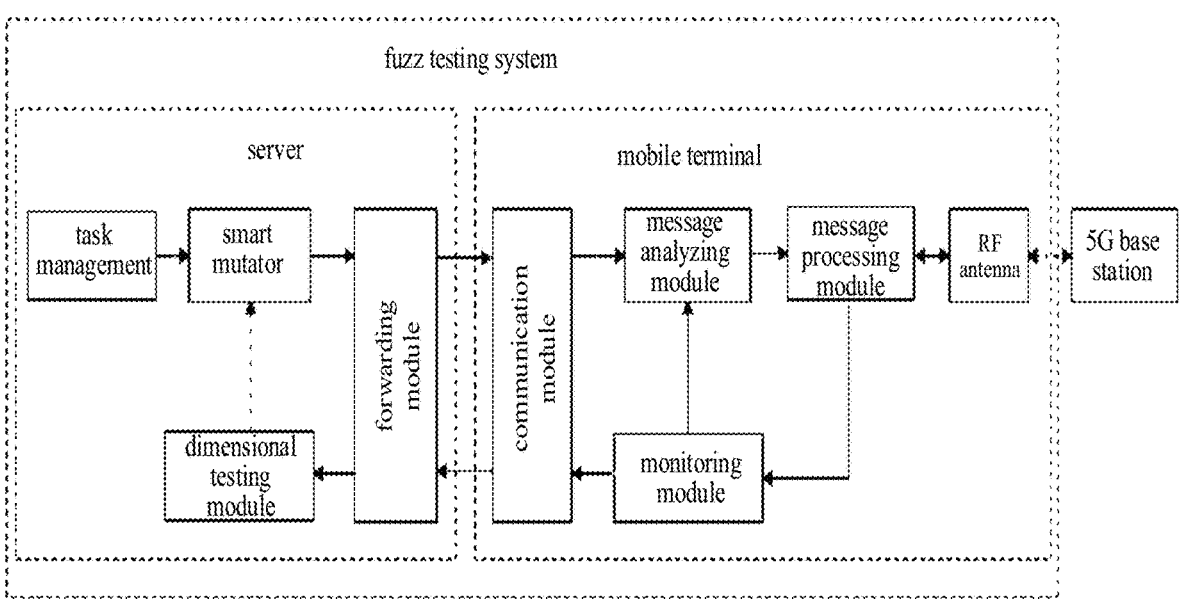
FIG. 9 is a schematic diagram of a system for mining a security vulnerability of an air interface protocol according to an embodiment of the present application.

In an example, the above-mentioned method embodiment can be embodied in the form of a module, which is named as a fuzz testing system, as shown in FIG. 9, including a task management module, located at the server (server), used for managing fuzzing tasks; an intelligent mutator, on the server, used to generate mutation data; a forwarding module, on the server, used for information interaction between the server and the mobile terminal; a maintenance module, on the server, used to complete local storage and interface display of base station state and recorded logs; a communication module, located in the mobile terminal, used for information interaction with the server; a message analysis module, located in the mobile terminal, used to complete the air interface protocol message analysis; a message processing module, located in the mobile terminal, used to complete the message mutation based on the mutation data and the analyzed message; a radio frequency antenna, located in the mobile terminal, used for information interaction with the base station; a monitoring module, located in the mobile terminal, used to monitor the state of the base station and complete the fuzz testing.

In traditional solutions, most of the air interface protocol tests are functional and performance tests, and it is difficult to find some deeper and wider security problems. In the embodiment of the present application, a mobile terminal based on an open bottom layer interface is provided to realize the method for mining the security vulnerability of the air interface protocol in fuzz testing. The air interface protocol can be reflected through the data transmission between the base station and the mobile terminal. Since the mobile terminal can open bottom port, the bottom port allows modification of the service messages of the air interface protocol, that is, by obtaining mutation data and service messages of the air interface protocol, modifying the service messages in combination with the mutation data, sending the modified service messages to the base station, and monitoring the base station in real time state, confirming the security problems of the base station caused by the modified air interface protocol, and then realizing the effect of mining the security vulnerability of the air interface protocol. In addition, the present application adopts the fuzzing test embedded in the air interface protocol process and analyzing the air interface data stream. The mutator is integrated into the machine learning algorithm, which can better perform fuzzing test on the air interface protocol. The depth of testing is deeper and the breadth is more comprehensive, which can improve the robustness and security of the base station and increase product competitiveness.

Figure 10:
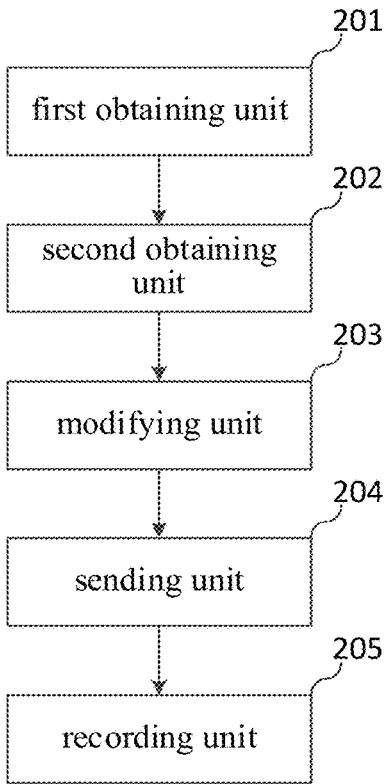
FIG. 10 is a schematic diagram of a device for mining a security vulnerability of an air interface protocol according to an embodiment of the present application.

Another embodiment of the present application relates to a device for mining the security vulnerability of the air interface protocol. The implementation details of the device for mining the security vulnerability of the air interface protocol in this embodiment are described in detail below. The following content is provided for the convenience of understanding. It is not necessary to implement this solution. FIG. 10 is a schematic diagram of a device for mining the security vulnerability of the air interface protocol described in this embodiment, including:

a first obtaining unit 201, configured to obtain mutation data; the mutation data is generated according to the fuzzing task;

a second obtaining unit 202, configured to obtain service messages;

a modifying unit 203, configured to modify the service message according to the mutation data;

a sending unit 204, configured to send the modified service message to the base station; and a recording unit 205, configured to monitor the state of the base station, and record a security vulnerability log according to the state of the base station.

For the first obtaining unit 201, the obtaining mutation data, for example: receiving mutation data obtained by the server according to the fuzzing task.

In an example, the receiving mutation data obtained by the server according to the fuzzing task, including: receiving the mutation data generated by the server according to a mutation method; the mutation method is determined by the fuzzing task, and the mutation method includes one of the following or any combination thereof: simultaneous mutation of multiple protocol fields, disordered mutation, and feedback mutation.

In one example, simultaneous mutation of multiple protocol fields, including: obtaining the required protocol configurations for the fuzzing task, and the protocol configurations including service messages of each protocol; using a mutation algorithm for each protocol configuration, and obtaining an use case seed pool; obtaining the mutation data from the use case seed pool.

In one example, the feedback mutation includes: obtaining the mobile terminal log message of the base station with a certain state feature, analyzing the state feature; placing the analysis result in a use case pool; using the mutation algorithm on the analysis result to obtain the mutation data.

For the modifying unit 203, after obtaining the service message of the air interface protocol and before modifying the service message according to the mutation data, it further includes: analyzing the service message; modifying the service message according to the mutation data includes:

determining the data position corresponding to the mutation data in the analyzed air interface protocol service message; modifying the analyzed air interface protocol service message according to the mutation data at the data position.

In an example, the modifying the service message according to the mutation data includes: within the scheduling delay of the service message, modifying the service message according to the mutation data.

For the recording unit 205, recording a security vulnerability log according to the state of the base station, for example: identifying whether the base station has a security vulnerability according to the state of the base station; if there is a security vulnerability, recording a security vulnerability log; the security vulnerability log includes protocol fields, service messages before and after mutation, and system logs of the mobile terminal.

In an example, after recording the security vulnerability log according to the state of the base station, the method further includes: retesting the security vulnerability according to the security vulnerability log to determine a problematic protocol field of the security vulnerability.

In traditional solutions, most of the air interface protocol tests are functional and performance tests, and it is difficult to find some deeper and wider security problems. In the embodiment of the present application, a mobile terminal based on an open bottom layer interface is provided to realize a method for mining the security vulnerability of the air interface protocol of the fuzz testing. Since the mobile terminal can open the bottom layer port, it is allowed to modify the service message of the air interface protocol, that is, by obtaining mutation data and service messages of the air interface protocol, modifying the service messages based on the mutation data, sending the modified service messages to the base station, and monitoring the state of the base station in real time. It can achieve the effect of recording security vulnerability logs of air interface protocol and mining security vulnerability of air interface protocol, thereby improving the robustness and security of base station and increasing product competitiveness.

It is not difficult to find that this embodiment is a device embodiment corresponding to the above method embodiment, and this embodiment can be implemented in cooperation with the above method embodiment. The relevant technical details and technical effects mentioned in the above embodiments are still valid in this embodiment, and will not be repeated here to reduce repetition. Correspondingly, the relevant technical details mentioned in this embodiment can also be applied in the above embodiments.

It is worth mentioning that all the modules involved in this embodiment are logical modules. In practical applications, a logical unit can be a physical unit, or a part of a physical unit, or combination of multiple physical units. In addition, in order to highlight the innovative part of the present application, units that are not closely related to solving the technical problem provided in the present application are not introduced in this embodiment, but this does not mean that there are no other units in this embodiment.

Figure 11:
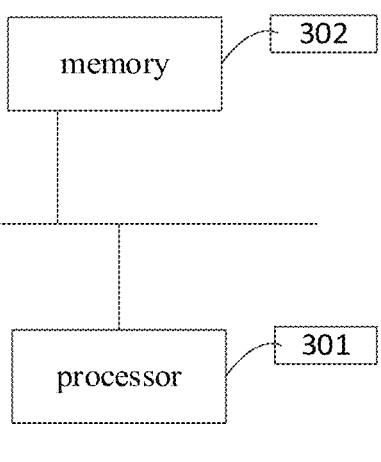
FIG. 11 is a schematic structural diagram of a mobile terminal according to an embodiment of the present application.

Another embodiment of the present application relates to a mobile terminal, as shown in FIG. 11, including: at least one processor 301; and a memory 302 communicatively connected to the at least one processor 301; the memory 302 stores instructions that can be executed by the at least one processor 301; the instructions are executed by the at least one processor 301, so that the at least one processor 301 can execute the method for mining the security vulnerability of the air interface protocol in the above-mentioned embodiments.

The memory and the processor are connected by a bus, and the bus may include any number of interconnected buses and bridges. The bus connects various circuits of one or more processors and memory together. The bus may also connect together various other circuits such as peripherals, voltage regulators, and power management circuits, all of which are well known in the art and therefore will not be further described herein. The bus interface provides an interface between the bus and the transceiver. A transceiver may be a single element or multiple elements, such as multiple receivers and transmitters, providing units for communicating with various other devices over a transmission medium. The data processed by the processor is transmitted on the wireless medium through the antenna, further, the antenna also receives the data and transmits the data to the processor.

The processor is responsible for managing the bus and general processing, and can also provide various functions, including timing, peripheral interface, voltage regulation, power management, and other control functions. Instead, memory can be used to store data that the processor uses when performing operations.

Another embodiment of the present application relates to a computer-readable storage medium storing a computer program. The above method embodiments are implemented when the computer program is executed by the processor.

That is, those skilled in the art can understand that all or part of the steps in the method of the above-mentioned embodiments can be completed by instructing related hardware through a program; the program is stored in a storage medium, and includes several instructions to make a device (it may be a single-chip microcomputer, a chip, etc.) or a processor to execute all or part of the steps of the methods described in the various embodiments of the present application. The aforementioned storage media include: U disk, mobile hard disk, read-only memory (ROM), random access memory (RAM), magnetic disk or optical disc, etc., which can store program codes.

Those skilled in the art can understand that the above-mentioned implementation modes are specific embodiments for realizing the present application, and in practical applications, various changes can be made to it in form and details without departing from the spirit and the scope of the present application.

What is claimed is:

1. A method for mining a security vulnerability of an air interface protocol, applied to a mobile terminal, comprising:
   obtaining mutation data, wherein the mutation data is generated according to a fuzzing task;
   obtaining a service message of the air interface protocol;
   modifying the service message according to the mutation data;
   sending the modified service message to a base station; and
   monitoring a state of the base station, and recording a security vulnerability log according to the state of the base station;
   wherein the obtaining the mutation data comprises:
      receiving the mutation data obtained by a server according to the fuzzing task;
   wherein the receiving the mutation data obtained by the server according to the fuzzing task comprises:
      receiving the mutation data generated by the server according to a mutation method;
   wherein, the mutation method is determined by the fuzzing task, and the mutation method comprises one of the following or any combination thereof: simultaneous mutation of multiple protocol fields, disordered mutation, and feedback mutation.

2. The method for mining the security vulnerability of the air interface protocol according to claim 1, wherein after the recording the security vulnerability log according to the state of the base station, the method further comprises:
   retesting the security vulnerability according to the security vulnerability log to determine a problematic protocol field of the security vulnerability.

3. The method for mining the security vulnerability of the air interface protocol according to claim 1, wherein after the obtaining the service message of the air interface protocol and before the modifying the service message according to the mutation data, the method further comprises:
   analyzing the service message;
   wherein the modifying the service message according to the mutation data comprises:
      determining a data position corresponding to the mutation data in the analyzed service message of the air interface protocol; and
      modifying the analyzed service message of the air interface protocol according to the mutation data at the data position.

4. The method for mining the security vulnerability of the air interface protocol according to claim 1, wherein the simultaneous mutation of multi-protocol fields comprises:
   obtaining configurations of each protocol required for the fuzzing task, wherein the configurations of each protocol comprise the service message of each protocol;
   configuring a mutation algorithm for the configurations of each protocol to obtain a use case seed pool; and
   obtaining the mutation data from the use case seed pool.

5. The method for mining the security vulnerability of the air interface protocol according to claim 1, wherein the feedback mutation comprises:
   obtaining state characteristics of the log message of the base station, and analyzing the state characteristics;
   putting analysis results in a use case pool; and
   configuring the mutation algorithm for the analysis results in the use case pool to obtain mutation data.

6. The method for mining the security vulnerability of the air interface protocol according to claim 1, wherein the recording the security vulnerability log according to the state of the base station comprises:
   identifying whether there is the security vulnerability in the base station according to the state of the base station; and
   in response to that there is the security vulnerability, recording the security vulnerability log;
   wherein, the security vulnerability log comprises protocol fields, service messages before and after mutation, and a system log of the mobile terminal.

7. The method for mining the security vulnerability of the air interface protocol according to claim 1, wherein the modifying the service message according to the mutation data comprises:
   modifying the service message according to the mutation data within a scheduling delay of the service message.

8. A device for mining a security vulnerability of an air interface protocol, comprising:
   a first obtaining unit configured to obtain mutation data, wherein the mutation data is generated according to a fuzzing task;
   a second obtaining unit configured to obtain a service message;
   a modifying unit configured to modify the service message according to the mutation data;

a sending unit configured to send the modified service message to a base station; and a recording unit configured to monitor a state of the base station, and record a security vulnerability log according to the state of the base station;

wherein the first obtaining unit configured to obtain mutation data comprises:

the first obtaining unit configured to receive the mutation data obtained by a server according to the fuzzing task;

wherein the first obtaining unit configured to receive the mutation data obtained by the server according to the fuzzing task comprises:

the first obtaining unit configured to receive the mutation data generated by the server according to a mutation method; wherein, the mutation method is determined by the fuzzing task, and the mutation method comprises one of the following or any combination thereof: simultaneous mutation of multiple protocol fields, disordered mutation, and feedback mutation.

9. A mobile terminal, comprising:

at least one processor; and a memory communicatively connected to the at least one processor;

wherein instructions executed by the at least one processor are stored in the memory; the instructions are executed by the at least one processor, so that the at least one processor performs the method for mining the security vulnerability of the air interface protocol according to claim 1.

10. A non-transitory computer-readable storage medium, storing a computer program, wherein when the computer program is executed by a processor, the method for mining the security vulnerability of the air interface protocol according to claim 1 is implemented.

* * * * *